(12) United States Patent
van Riel et al.

(10) Patent No.: US 10,942,757 B2
(45) Date of Patent: Mar. 9, 2021

(54) VIRTUAL MACHINE SECURITY THROUGH GUEST-SIDE EMULATION

(71) Applicant: Red Hat, Inc., Raleigh, NC (US)

(72) Inventors: Henri Han van Riel, Merrimack, NH (US); Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 103 days.

(21) Appl. No.: 15/443,291

(22) Filed: Feb. 27, 2017

(65) Prior Publication Data

US 2018/0246749 A1 Aug. 30, 2018

(51) Int. Cl.
G06F 9/455 (2018.01)
G06F 9/50 (2006.01)
G06F 8/61 (2018.01)

(52) U.S. Cl.
CPC ........ *G06F 9/45558* (2013.01); *G06F 9/4555* (2013.01); *G06F 9/5077* (2013.01); *G06F 8/63* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 6,253,224 B1 * | 6/2001 | Brice, Jr. | ............ | G06F 9/45558 711/208 |
| 6,496,847 B1 * | 12/2002 | Bugnion | ............. | G06F 9/45533 703/21 |
| 6,681,238 B1 * | 1/2004 | Brice, Jr. | ................ | G06F 9/455 711/203 |
| 7,580,826 B2 * | 8/2009 | Vega | .................... | G06F 9/45558 703/13 |
| 7,904,914 B2 * | 3/2011 | Green | ................. | G06F 9/45533 719/321 |
| 7,945,436 B2 * | 5/2011 | Ang | ..................... | G06F 9/45558 703/23 |
| 7,979,749 B2 * | 7/2011 | Jann | ....................... | G06F 11/079 709/223 |
| 8,127,292 B1 * | 2/2012 | Dobrovolskiy | ..... | G06F 9/45541 717/174 |
| 8,612,633 B2 * | 12/2013 | Cleeton | .............. | G06F 9/45558 703/24 |
| 8,627,413 B2 * | 1/2014 | Youngworth | ......... | G06F 12/109 726/4 |
| 8,671,405 B2 | 3/2014 | Nicholas et al. | | |
| 9,176,765 B2 * | 11/2015 | Chen | ................... | G06F 9/45558 |
| 9,207,939 B2 | 12/2015 | Hattori et al. | | |
| 9,342,347 B1 * | 5/2016 | Beloussov | ............ | G06F 9/5077 |
| 9,514,507 B2 | 12/2016 | McKenzie et al. | | |

(Continued)

*Primary Examiner* — Abu Zar Ghaffari
(74) *Attorney, Agent, or Firm* — Lowenstein Sandler LLP

(57) ABSTRACT

Systems and methods for embedding emulation support for a hardware feature into a virtual machine to enhance the security of the hypervisor and host system. An example method may comprise: receiving, by a processing device executing a hypervisor, a message indicating a hardware feature is unavailable; determining, by the hypervisor, whether a virtual machine is capable of emulating the hardware feature; and causing, by the hypervisor, the virtual machine to emulate the hardware feature in response to determining the virtual machine is capable of emulating the hardware feature.

18 Claims, 6 Drawing Sheets

(56) References Cited

U.S. PATENT DOCUMENTS

| | | | | |
|---|---|---|---|---|
| 2005/0138370 A1* | 6/2005 | Goud | G06F 21/53 | 713/164 |
| 2005/0216920 A1* | 9/2005 | Tewari | G06F 9/5011 | 719/324 |
| 2005/0246453 A1* | 11/2005 | Erlingsson | G06F 9/45558 | 710/1 |
| 2007/0028244 A1* | 2/2007 | Landis | G06F 9/5016 | 718/108 |
| 2007/0050764 A1* | 3/2007 | Traut | G06F 9/45558 | 718/1 |
| 2009/0172667 A1* | 7/2009 | Wang | G09G 5/363 | 718/1 |
| 2011/0004935 A1* | 1/2011 | Moffie | G06F 21/53 | 726/23 |
| 2011/0107331 A1* | 5/2011 | Evans | H04W 4/003 | 718/1 |
| 2011/0185292 A1* | 7/2011 | Chawla | G06F 9/452 | 715/760 |
| 2011/0246171 A1* | 10/2011 | Cleeton | G06F 9/45558 | 703/25 |
| 2012/0054740 A1* | 3/2012 | Chakraborty | G06F 9/45558 | 718/1 |
| 2012/0131571 A1* | 5/2012 | Ben-Yehuda | G06F 9/45558 | 718/1 |
| 2012/0131575 A1* | 5/2012 | Yehuda | G06F 9/45558 | 718/1 |
| 2012/0254862 A1* | 10/2012 | Dong | G06F 9/4856 | 718/1 |
| 2012/0278818 A1* | 11/2012 | Green | G06F 9/45558 | 719/321 |
| 2013/0055254 A1* | 2/2013 | Avasthi | G06F 9/5077 | 718/1 |
| 2013/0275979 A1* | 10/2013 | Tsirkin | G06F 9/45558 | 718/1 |
| 2014/0025770 A1* | 1/2014 | Warfield | G06F 15/17331 | 709/213 |
| 2014/0250439 A1* | 9/2014 | Parashar | G06F 9/5083 | 718/104 |
| 2014/0298335 A1* | 10/2014 | Regev | G06F 11/261 | 718/1 |
| 2015/0089502 A1* | 3/2015 | Horovitz | G06F 9/45558 | 718/1 |
| 2015/0261686 A1* | 9/2015 | Nampoothiri | G06F 13/28 | 710/308 |
| 2015/0317175 A1* | 11/2015 | Tada | G06F 11/1484 | 718/1 |
| 2016/0149975 A1* | 5/2016 | Taylor | H04L 65/403 | 709/223 |
| 2016/0371118 A1* | 12/2016 | Dhanraj | G06F 9/5077 | |
| 2016/0378627 A1* | 12/2016 | Lange | G06F 11/3684 | 714/33 |
| 2017/0048110 A1* | 2/2017 | Wu | H04L 41/12 | |
| 2017/0200005 A1* | 7/2017 | Mooring | G06F 9/45558 | |
| 2018/0217895 A1* | 8/2018 | Lim | G11C 29/42 | |
| 2018/0314540 A1* | 11/2018 | Iyer | G06F 9/45558 | |

\* cited by examiner

VIRTUAL MACHINE SECURITY THROUGH GUEST-SIDE EMULATION

TECHNICAL FIELD

The present disclosure is generally related to virtualized computer systems, and more particularly, to the emulation of hardware features by a virtualized computer system.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An abstraction layer that provides the virtualization is commonly referred to as a hypervisor or a virtual machine monitor (VMM). The hypervisor emulates the underlying hardware of the host computer, making the use of the virtual machine transparent to the guest operating system and the user of the computer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
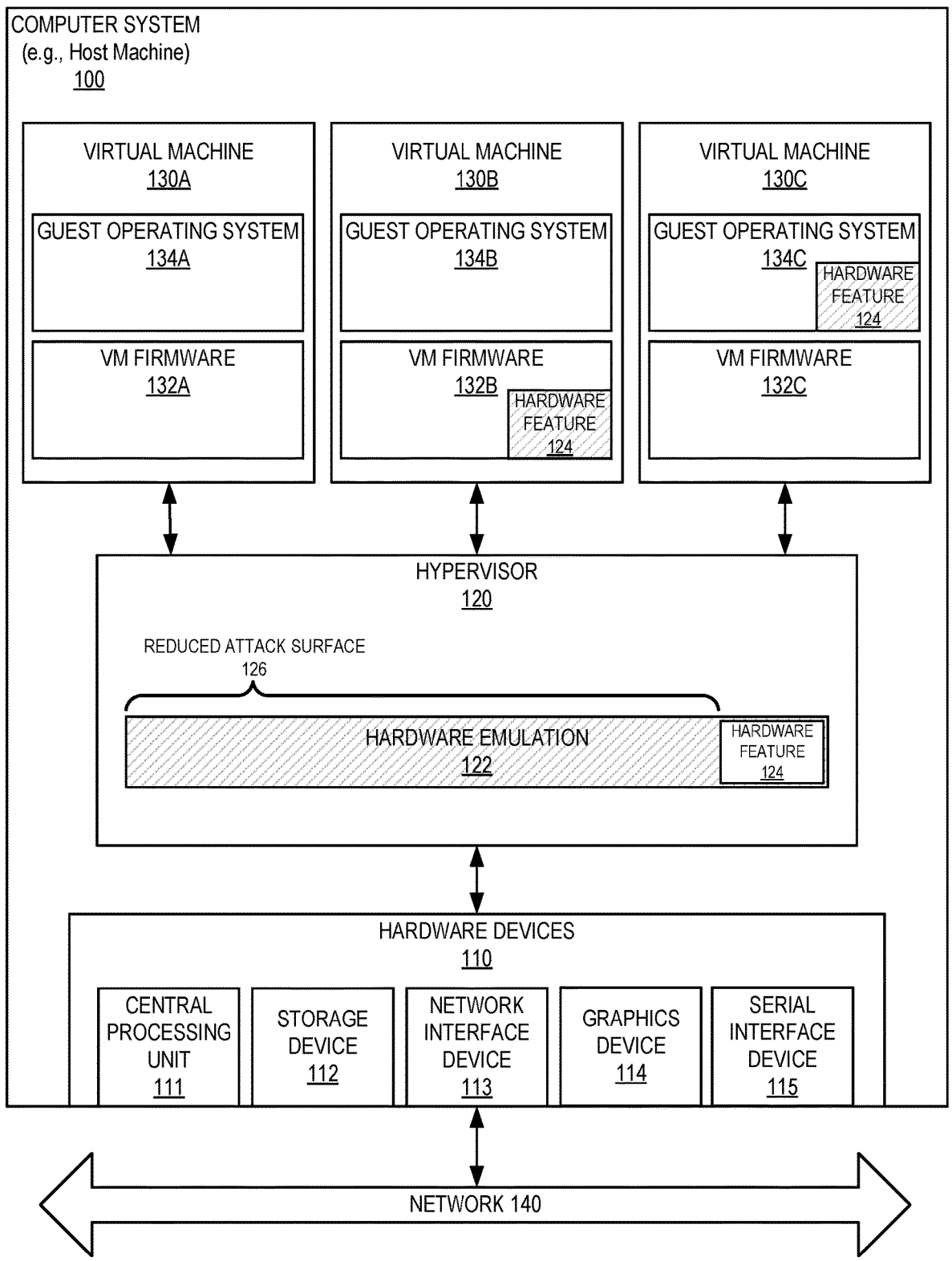
FIG. 1 depicts a high-level block diagram of an example computer system architecture that embeds emulation functionality into one or more virtual machines to reduce the attack surface of the hypervisor, in accordance with one or more aspects of the present disclosure.

Virtualized computer systems rely on hardware features to perform computing tasks. Some of the hardware features may be provided by the underlying hardware and other hardware features may be emulated by the hypervisor. The emulation of hardware may be provided by executable code and may include vulnerabilities that enable a process executing within a virtual machine to modify executable data or informational data to gain privileges available to the hypervisor. The exploitation of a vulnerability is often referred to as an attack and the various points of attack may define the "attack surface."

Aspects of the present disclosure address the above and other deficiencies by providing technology that enables a computer system to embed hardware emulation features known to be provided by the hypervisor into the virtual machine. Hardware emulation features may include, for example, features provided by a serial interface, a graphics card, a network interface card, other hardware device, or a combination thereof. The emulation of the hardware feature may be embedded into firmware of the virtual machine, the guest operating system, other portion of the virtual machine, or a combination thereof. When a virtual machine makes a request for the hardware feature (e.g., graphics operation), the hypervisor may be notified that the hardware features is unavailable. The hypervisor may then initiate the virtual machine to emulate the hardware feature as opposed to having the hypervisor provide the emulation of the hardware feature. In one example, the computer system may disable a particular virtual machine or multiple (e.g., all) virtual machines from utilizing the emulation code of the hypervisor. In another example, the computer system may remove the emulation code from the hypervisor.

The systems and methods described herein include technology that may enhance the security of the virtualized computer system. In particular, aspects of the present disclosure may reduce the attack surface of the hypervisor by reducing the amount of code in the hypervisor that a virtual machine can cause to be executed. Moving the hardware emulation from the hypervisor to the virtual machine may also reduce the incentive associated with exploiting a security vulnerability. Attackers often attempt to exploit a security vulnerability to enhance the privileges associated with their executable code. The privileges of executable code running as a part of a hypervisor are often greater than if the executable code were running within the virtual machine. By moving a potential vulnerabilities within emulated code from the hypervisor to the virtual machine a process of the virtual machine that exploits the vulnerability in the hardware emulation would end up back in the execution space of the virtual machine, as opposed to in the execution space of the hypervisor with additional access or privileges.

Various aspects of the above referenced methods and systems are described in details herein below by way of examples, rather than by way of limitation. The examples provided below discuss a virtualized computer system without a host operating system, but other examples may include a hypervisor that executes within a host operating system.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include hardware devices 110, a hypervisor 120, and one or more virtual machines 130A-C.

Hardware devices 110 may provide hardware features for performing computing tasks. Hardware devices 110 may include a central processing unit 111, a storage device 112, a network interface device 113, a graphics device 114, a serial interface device 115, other hardware, or combination thereof. Central processing unit 111 may refer to devices capable of executing instructions encoding arithmetic, logical, or I/O operations. Central processing unit 111 may be a single core processor, which may be capable of executing one instruction at a time (e.g., single pipeline of instructions) or a multi-core processor, which may simultaneously execute multiple instructions. Storage device 112 may include any data storage that is capable of storing digital data, such as physical memory devices including volatile memory devices (e.g., RAM), non-volatile memory devices (e.g., NVRAM), other types of memory devices, or a combination thereof. Storage device 112 may include mass storage devices, such as solid-state storage (e.g., Solid State Drives (SSD)), hard drives, other persistent data storage, or a combination thereof. Network interface device 113 may provide access to a network internal to the computer system 100 or external to the computer system 100 (e.g., network 140) and in one example may be a network interface card (NIC). Graphics device 114 may provide graphics processing for the computer system 100 and/or one or more of the virtual machines 130A-C. One or more of hardware devices 110 may be combined or consolidated into one or more hardware devices or may be absent from hardware devices 110 and may instead be partially or completely emulated by hypervisor 120.

Hypervisor 120 may also be known as a virtual machine monitor (VMM) and may provide virtual machines 130A-C with access to one or more features of the underlying hardware. In the example shown, hypervisor 120 may run directly on the hardware of computer system 100 (e.g., host machine). In other examples, hypervisor 120 may run on or within a host operating system (not shown). Hypervisor 120 may manage system resources, including access to hardware devices 110. Hypervisor 120, though typically implemented as executable code, may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc. Hypervisor 120 may support any number of virtual machines 130A-C (e.g., a single VM, one hundred VMs, etc.).

Virtual machines 130A-C may include virtual machine firmware 132A-C, guest operating systems 134A-C, one or more applications (not shown), other executable code, or a combination thereof. Firmware 132A-C and guest operating systems 134A-C may be included and stored within a virtual machine image of a respective virtual machine. Firmware 132A-C may be a type of low-level executable code (e.g., assembly code, microcode) that provides control, monitoring, and interaction with hardware (e.g., physical hardware or emulated hardware). Firmware 132A-C may perform hardware initialization of the physical or virtualized hardware and provide a basic input/output system (BIOS). The initialization may occur during a booting process (e.g., power-on startup) and may continue beyond the initialization to provide runtime services for the guest operating system 134 and other higher-level executable code. Firmware 132A-C may be run (e.g., executed) prior to the loading of guest operating system 134. Guest operating system 134A-C may include a type of high-level executable code with one or more management modules, device drivers, or other executable code for interacting with firmware 132 to access hardware features provided by the underlying hardware devices 110.

Hypervisor 120 may provide firmware 132 and guest operating system 134 with access to one or more hardware features. The hardware features may include one or more commands, functions, instructions, other operation, or a combination thereof that provide or execute a computation or computing service that modifies data, stores data, transmits data, receives data, or performs another operation related to data stored or accessible to hardware. The hardware features may be provided directly by hardware devices 110 or may be provided indirectly by hardware emulation (e.g., hardware emulation 122). Hardware emulation may be the process of imitating the functionality of one or more pieces of hardware and may be provided by another piece of hardware (e.g., CPU), lower-level executable code (e.g., firmware), higher-level executable code (e.g., operating system), or a combination thereof. In one example, a hardware feature may be a graphics operation that interprets stored data to generate or render an image. In another example, a hardware features may be a network interface operation that packages data according to one or more protocols (e.g., TCP/IP) to enable the data to be transmitted over a virtual or physical network interface device.

Hardware feature 124 may be any hardware functionality that is not available to a virtual machine directly from hardware devices 110 and is capable of being emulated. Hardware feature 124 may be associated with a hardware device that exists in computer system such as serial interface device 115, graphics device 114, network interface device 113, storage device 112, central processing unit 111, or any other hardware device within computer system 100. Alternatively, hardware feature 124 may be associated with a hardware device that does not exist on computer system 100. For example, computer system 100 may be a server machine that does not include a graphics device 114 (e.g., video card) and hypervisor 120 may provide hardware features of a virtualized graphics device using hardware emulation 122.

The emulation of hardware feature 124 may occur within hypervisor 120, virtual machine 130, or a combination thereof. In the example shown in FIG. 1, a portion of the hardware features emulated by hypervisor 120 may have been moved to the virtual machine. For example, hardware feature 124 was previously provided by the hypervisor as part of hardware emulation 122 and may now exist in the firmware of a virtual machine (e.g., as seen with virtual machine 130B) or in the guest operating system of a virtual machine (e.g., as seen with virtual machine 130C). Moving the emulation functionality (e.g., emulation code) from the hypervisor to the virtual machine may reduce the attack surface of hypervisor 120.

Reduced attack surface 126 may illustrate a reduction of the attack surface of hypervisor 120. The attack surface may be a term that represents the sum of different points where an unauthorized process or user (e.g., attacker) can try to enter data or extract data from a computing environment. The attack surface may be reduced by reducing the amount of code in hypervisor 120 that virtual machines 130A-C can cause to be executed. As discussed herein, the attack surface of hypervisor 120 may be reduced by moving emulation code from hypervisor 120 into one or more of the virtual machines 130A-C. Reducing the code executed by the hypervisor reduces the number of entry points available to an untrusted process or user. In one example, hypervisor may result in reduced attack surface 126 by disabling code, such as the code necessary to emulate hardware feature 124.

By having less code available to the virtual machines, there is a reduced possibility that a vulnerability will be exploited.

Figure 2:
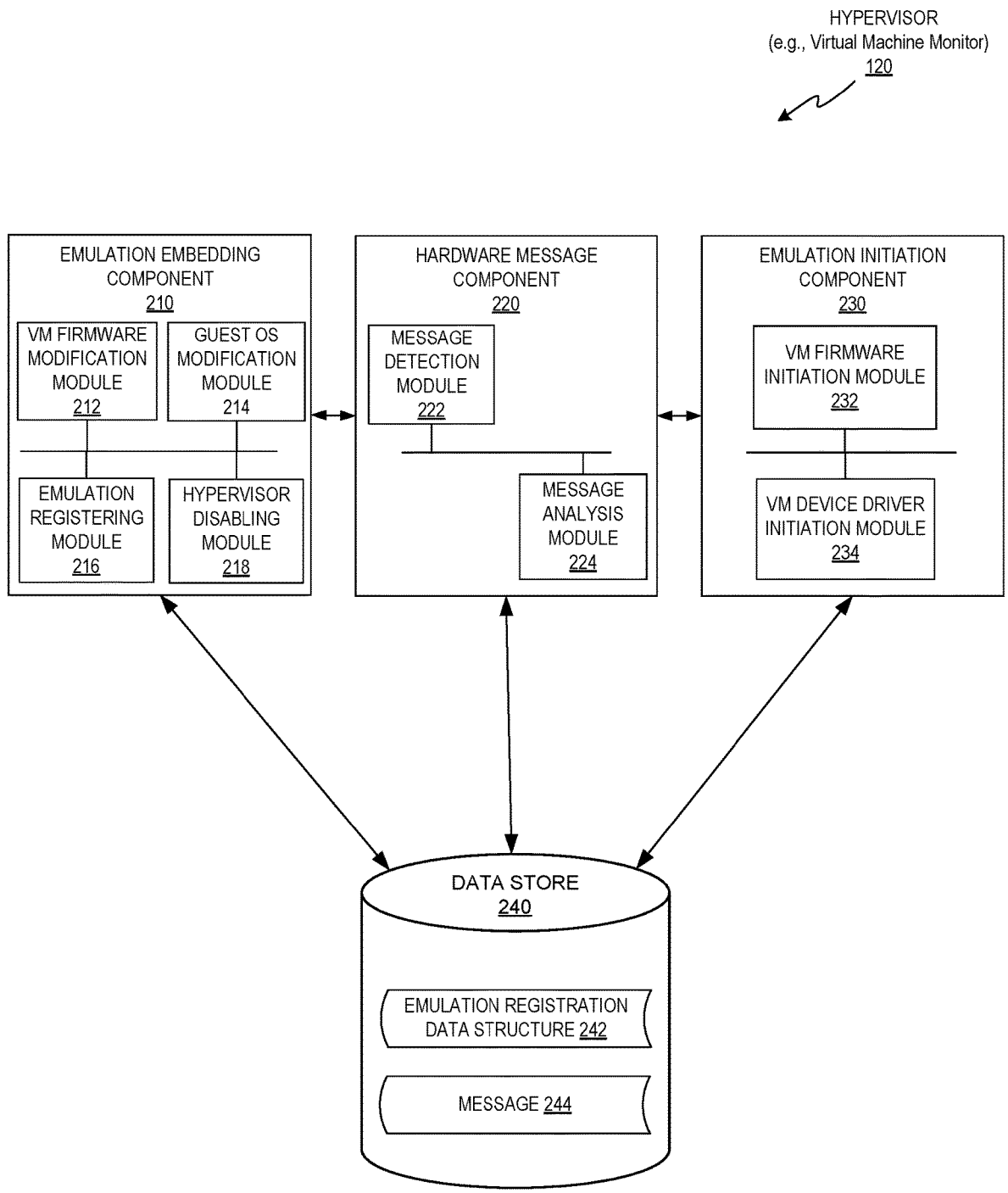
FIG. 2 depicts a block diagram of an example hypervisor, in accordance with one or more aspects of the present disclosure.

FIG. 2 is a block diagram illustrating example components and modules of hypervisor 120, in accordance with one or more aspects of the present disclosure. In the example shown, hypervisor 120 may include an emulation embedding component 210, a hardware message component 220, and an emulation initiation component 230.

Emulation embedding component 210 may update a virtual machine to enable the virtual machine to emulate one or more hardware features. This may replace or supplement emulation functionality provided by hypervisor 120. Emulation embedding component 210 may also register the emulation functionality of the virtual machine for subsequent access by the hypervisor. In the examples discussed below, the hypervisor may perform the functionality of emulation embedding component 210 to update the virtual machine, however in other examples emulation embedding component 210 may be performed by another computing system. In one example, a separate computing system (e.g., provisioning server) may perform the embedding during the creation of the virtual machine (e.g., virtual machine image creation). In another example, a separate computing system may interact with a running virtual machine to install or configure the hardware emulation. As shown in FIG. 2, emulation embedding component 210 may include a VM Firmware modification module 212, a guest operating system modification module 214, an emulation registration module 216, and a hypervisor disabling module 218.

VM Firmware modification module 212 may modify the firmware of a virtual machine to emulate one or more hardware features. As discussed above, the firmware of a virtual machine may be stored within a virtual machine image and may include low-level code (e.g., assembly code, microcode) that provides control, monitoring, and interaction with hardware access provided by the hypervisor. The virtual machine firmware may be loaded into memory of the virtual machine prior to loading or initiating the guest operating system. VM firmware modification module 212 may modify the firmware of the virtual machine by modifying the image of the virtual machine to include executable code that emulates a hardware feature. In one example, the firmware of the virtual machine may be modified while the virtual machine image is being created. In another example, the firmware of the virtual machine may be modified after the virtual machine image is created but before the virtual machine image is loaded and executed. In yet another example, the firmware of the virtual machine may be modified after the virtual machine image is loaded by the hypervisor, in which case the firmware of a currently executing virtual machine may be modified while the virtual machine is loaded in memory of the computer system.

Guest operating system modification module 214 may modify the guest operating system of a virtual machine to emulate one or more hardware features. As discussed above, the guest operating system of a virtual machine may be stored within a virtual machine image and may include higher-level code (e.g., device drivers, memory management modules) that is loaded into memory of the virtual machine by the firmware. Guest operating system modification module 214 may modify the guest operating system of the virtual machine by modifying the image of the virtual machine to include executable code that emulates a hardware feature. The guest operating system may be modified before, during, or after the guest operating system is loaded by the virtual machine firmware. The modification may involve installing a device driver or updating an existing device driver so that the device driver supports emulating the hardware feature. In one example, the guest operating system of the virtual machine may be modified by a separate computing system (e.g., provisioning server) before, during, or after the creation of the virtual machine image. In another example, the guest operating system of the virtual machine may be modified by the hypervisor after the virtual machine image is created but before the virtual machine image is loaded or executed by the hypervisor. In yet another example, the guest operating system of the virtual machine may be modified by the hypervisor after the virtual machine image is loaded by the hypervisor, in which case the emulation features (e.g., emulation code) is embedded into a currently executing virtual machine while the virtual machine is loaded and running in memory of the virtual machine.

Emulation registration module 216 may keep track of which hardware features can be emulated by the virtual machine and may involve maintaining an emulation registration data structure 242. Emulation registration data structure 242 may include hardware feature data that indicates or identifies one or more particular hardware features and capability data that indicates whether the virtual machine is or is not capable of emulating the particular hardware features. Emulation registration data structure 242 may include an array, list, table, tree, or other arrangement of data. In one example, emulation registration data structure 242 may be a table with an entry for each hardware feature (e.g., hardware instruction, command, or operation) and corresponding capability data indicating that a particular virtual machine is capable of emulating or not capable of emulating the respective hardware feature. Emulation registration data structure 242 may be created by the hypervisor, virtual machine (e.g., VM firmware, VM operating system), or another management component. The creation of emulation registration data structure 242 may be performed by the same computing device that updates the virtual machine to support emulation of the hardware feature or may be created by a different computing device (e.g., provisioning server).

Emulation registration data structure 242 may include registration data for emulated hardware features related to multiple physical hardware devices, multiple virtual hardware devices, or a combination thereof. The hardware features may be organized in a hierarchical manner, such that, the emulated hardware features corresponding to a particular physical or virtual device may be represented as being below that device within the emulation registration data structure 242. In one example, the emulation registration data structure 242 may correspond to an individual virtual machine. In another example, the emulation registration data structure 242 may correspond to multiple (e.g., all) virtual machines running on the hypervisor.

Emulation registration module 216 may update emulation registration data structure 242 to reflect the emulation capabilities of the one or more virtual machines. The updating may occur before, during, or after the virtual machine is modified to include the emulation capability and before, during, or after the virtual machine is loaded and initialized. In one example, during the initialization of the virtual machine firmware (e.g., virtualized hardware boot process) the firmware may indicate to the hypervisor which hardware features can be emulated by the firmware of the virtual machine. In another example, during the initialization of the guest operating system (e.g., operating system boot process) a device drive or other component of the operating system may indicate to the hypervisor which hardware features can be emulated by the guest operating system.

Hypervisor disabling module 218 may modify the hypervisor to disable portions of the hardware emulation that the virtual machine can now provide. Hypervisor disabling module 218 may determine which hardware features the virtual machine can emulate and may disable the emulation of the corresponding hardware features in the hypervisor. Hypervisor disabling module 218 may update the hypervisor to disable the hardware emulation for a particular virtual machine or may disable the hardware emulation for all virtual machines executing on the hypervisor.

The disabling may block the ability of the virtual machine to cause the hypervisor to perform the emulation of the hardware feature. In one example, disabling an emulated feature may involve adding, removing, or replacing executable code of the hypervisor. For example, the hypervisor may replace the hypervisor side emulation functionality with an invocation of the emulation functionality inside the virtual machine. In another example, disabling a feature may also or alternatively involve updating a configuration of the hypervisor that modifies configuration data without updating executable data. For example, updating the configuration may update a security policy that indicates which emulation functionality can or cannot be executed by the hypervisor. The security policy may also, in response to attempting to invoke a restricted hardware feature, cause the computer system to log a warning, jump to a specified handler address inside the virtual machine, halt the virtual machine and optionally save the memory image of the virtual machine to disk for subsequent examination; reboot the virtual machine, shut down the virtual machine, or a combination thereof.

Disabling the hardware emulation performed by the hypervisor may enhance the security of the hypervisor and therefore may enhance the security of the computer system hosting the hypervisor. Moving the hardware emulation from the hypervisor to the virtual machine may also reduce the incentive of exploiting a security vulnerability in the emulation code because the virtual machine process exploiting the vulnerability would end up back in the virtual machine execution space, as opposed to the execution space of the hypervisor, which may have additional access or privileges.

Hardware message component 220 may be a portion of the hypervisor that detects and analyzes messages received from the hardware interface of the computer system 100. The hardware interface may be a physical interface that includes mechanical, electrical, and/or logical signals and protocols for signaling. In the example shown in FIG. 2, hardware message component 220 includes a message detection module 222 and a message analysis module 224.

Message detection module 222 may be a portion of hypervisor 120 that receives messages (e.g., message 242) from the hardware interface. Message 242 may be a hardware message in the form of an interrupt, trap, notification, exception, fault, instruction, other operation, or a combination thereof. Message 242 may be initiated by the underlying hardware (e.g., a physical hardware device) and may cause the hypervisor to take action (e.g., begin execution). In one example, the message may be a VMEXIT message that marks the point at which a transition is made between a currently running virtual machine and the hypervisor. The hardware (e.g., CPU) may transition the computing execution from the virtual machine to the hypervisor so that the hypervisor can respond to the message. For example, the hypervisor may perform a function, such as initiating the emulation of a hardware feature that is unavailable on the underlying hardware.

The hardware features may be unavailable by the underlying hardware for a variety of reasons. In one example, the underlying hardware device may not support the hardware feature because it does not recognize or support the particular instruction (e.g., command or operation) associated with the hardware feature. In another example, the underlying hardware device may recognize the instruction but may not be capable of processing the instruction at this time. In yet another example, the underlying hardware may support the instruction but may not support the data associated with the instruction. For example, the data may not be arranged or organized in format or protocol that is interoperable with the hardware. Hardware features may also be unavailable if it is associated with a hardware device or hardware interface that is not physically present, such as making a call to a hardware device (e.g., graphics device) that is not physically present and instead is only virtualized. After the message is detected, the message may be analyzed by message analysis module 224.

Message analysis module 224 may analyze message 242 to determine how the hypervisor should respond. Message 242 may include hardware feature data that indicates which hardware feature is unavailable and may include data indicating why the hardware features is unavailable (e.g., error code, faulting address within a page fault). As discussed above, message 242 may be a VMEXIT message and the VMEXIT message may include data or links to data that indicate a particular hardware feature (e.g., guest instruction), data associated with the instruction, a cause for why the hardware feature is unavailable (e.g., exit reason), or a combination thereof. In one example, the hypervisor may respond to message 242 by calling emulation embedding component 210 to embed hardware emulation into the virtual machine and may also update the emulation registration data structure 242 accordingly. In another example, the virtual machine may already include support for emulating the hardware feature.

Message analysis module 224 may use emulation registration data structure 242 to determine whether the virtual machine can emulate the hardware feature associated with message 242. Message analysis module 224 may directly access emulation registration data structure 242 or may query another computer system or hypervisor module to access data of emulation registration data structure 242 to check for supported hardware feature emulation. When the emulation registration data structure 242 indicates the virtual machine is not capable of (e.g., does not support) emulating the hardware feature, the hypervisor may perform the hardware emulation. When the emulation registration data structure 242 indicates the virtual machine is capable of (e.g., supports) emulating the hardware feature, the hypervisor may communicate with emulation initiation component 230.

Emulation initiation component 230 may enable the hypervisor to cause the virtual machine to perform emulation of the hardware feature. There may be multiple different procedures to invoke the virtual machine to perform the emulation and the procedure used may depend on which portion of the virtual machine includes support for the emulation. In the example shown in FIG. 2, emulation initiation component 230 may include a virtual machine firmware initiation module 232 and a virtual machine device driver initiation module 234. However, in an actual implementation, only one of the modules may be present.

Virtual machine firmware initiation module 232 may enable the hypervisor to cause the firmware of the virtual machine to emulate one or more hardware features. In one example, module 232 may generate a data structure that includes data that indicates the location of emulation code within the firmware of the virtual machine and a location to jump to after the emulation is complete. The hypervisor may then cause the VM to re-enter execution by, for example, initiating a VMENTER message (e.g., operation, command, or instruction). A VMENTER message may mark the point at which a transition is made between a currently running hypervisor and a virtual machine. The hardware (e.g., CPU) may transition the computing execution from the hypervisor to the virtual machine so that the virtual machine can perform a function, such as emulating a hardware feature that is unavailable on the underlying hardware. The VMENTER message may be similar to the VMEXIT but may perform a transition in the opposite direction, namely from the hypervisor to the virtual machine as opposed to the virtual machine to the hypervisor. After the emulation has been handled, the emulation functionality within the firmware can jump back to the portion of the guest operating system code that triggered the emulation.

Virtual machine device driver initiation module 234 may enable the hypervisor to cause the device driver of the virtual machine to emulate one or more hardware features. In one example, the hypervisor may initiate an interrupt or transmit an interrupt generated by a physical hardware device to the guest operating system. Responsive to the interrupt, the guest operating system may invoke the device driver to perform the emulation of the hardware feature. The interrupt may be a non-maskable interrupt (NMI) which may be a notification or alert issued by the processor executing the virtual machine and may indicate an event needs attention. The interrupt may be received by an interrupt handler of the virtual machine and the interrupt handler may cause the virtual machine to perform the emulation. In another example, the hypervisor may generate an exception that is received by an exception handler of the virtual machine and may cause the virtual machine to perform the emulation of the hardware feature. In yet another example, the hypervisor may make a call to the virtual machine to initiate emulation of the hardware feature.

Figure 3:
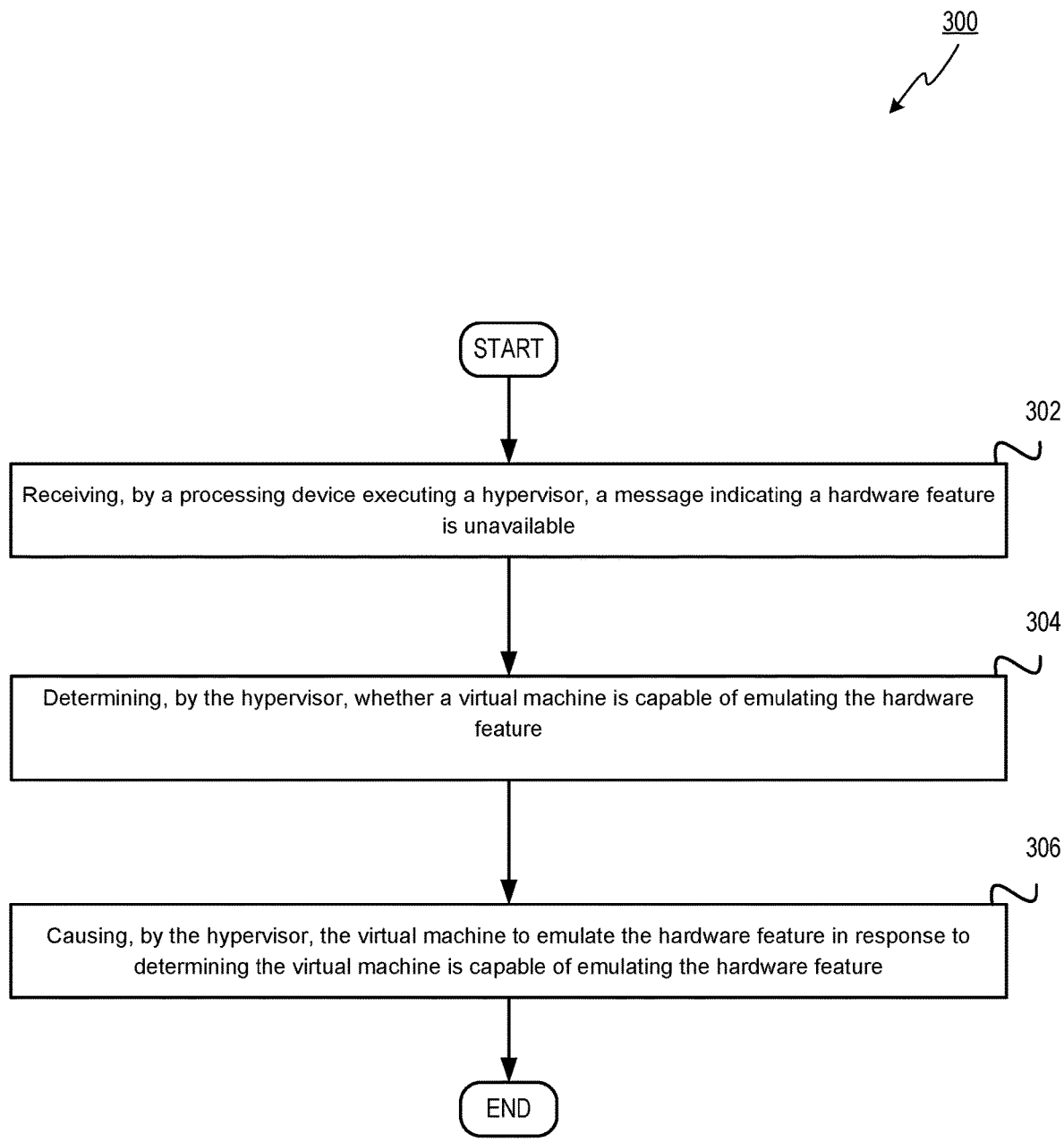
FIG. 3 depicts a flow diagram of an example method for embedding and using emulation functionality of the virtual machines to enhance security, in accordance with one or more aspects of the present disclosure.

FIG. 3 depicts a flow diagram of an illustrative example of a method 300 for embedding the emulation of hardware features into a virtual machine, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by hypervisor 120 as shown in FIGS. 1 and 2.

Method 300 may be performed by processing devices of a server device or a client device and may begin at block 302. At block 302, a processing device executing a hypervisor may receive a message indicating a hardware feature is unavailable. The message may be received from a hardware interface (e.g., physical hardware interface) and may include data indicating an instruction and a cause associated with the hardware feature that is unavailable. In one example, the message may be received in response to a request received from the virtual machine. The request may be a request to perform a hardware instruction that invokes the hardware feature.

At block 304, the processing device executing the hypervisor may determine whether a virtual machine is capable of emulating the hardware feature. Determining whether the virtual machine is capable of emulating the hardware features may involve the hypervisor analyzing the message to identify the hardware feature that is unavailable and inspecting a data structure that indicates a plurality of hardware features that the virtual machine is capable of emulating. In one example, the hypervisor may create the data structure, which may include data indicating a plurality of hardware features that the virtual machine can emulate. The hypervisor may also update, during an initiation of the virtual machine, the data of the data structure to indicate the virtual machine can emulate the hardware feature.

At block 306, the processing device executing the hypervisor may cause the virtual machine to emulate the hardware feature in response to determining the virtual machine is capable of emulating the hardware feature. Causing the virtual machine to emulate the hardware features may involve the hypervisor transmitting an interrupt generated by a hardware device to the virtual machine to initiate emulation of the hardware feature or transmit an exception generated by the hypervisor to the virtual machine to initiate emulation of the hardware feature. The hypervisor may also or alternatively make a call to the virtual machine to initiate emulation of the hardware feature. In one example, the hypervisor may emulate the hardware feature in response to determining the virtual machine is unable to emulate the hardware feature. Responsive to completing the operations described herein above with references to block 306, the method may terminate.

Method 300 may also involve updating the virtual machine to support emulation of the hardware feature. The updating may occur after receiving the message that the hardware feature is unavailable, prior to booting an image of the virtual machine, or during a creation of an image of the virtual machine. In one example, updating the virtual machine may involve modifying a firmware of the virtual machine to emulate the hardware feature. In another example, updating the virtual machine may involve modifying a guest operating system of the virtual machine to comprise a device driver that emulates the hardware feature. The updating of the virtual machine may be performed by the hypervisor or by a separate component executing on the same or a different processing device. In one example, a separate computing system (e.g., management component, provisioning server) may perform the embedding before, during, or after the creation of the virtual machine image. In another example, a separate computing system may interact with a running virtual machine to install or configure the hardware emulation.

Figure 4:
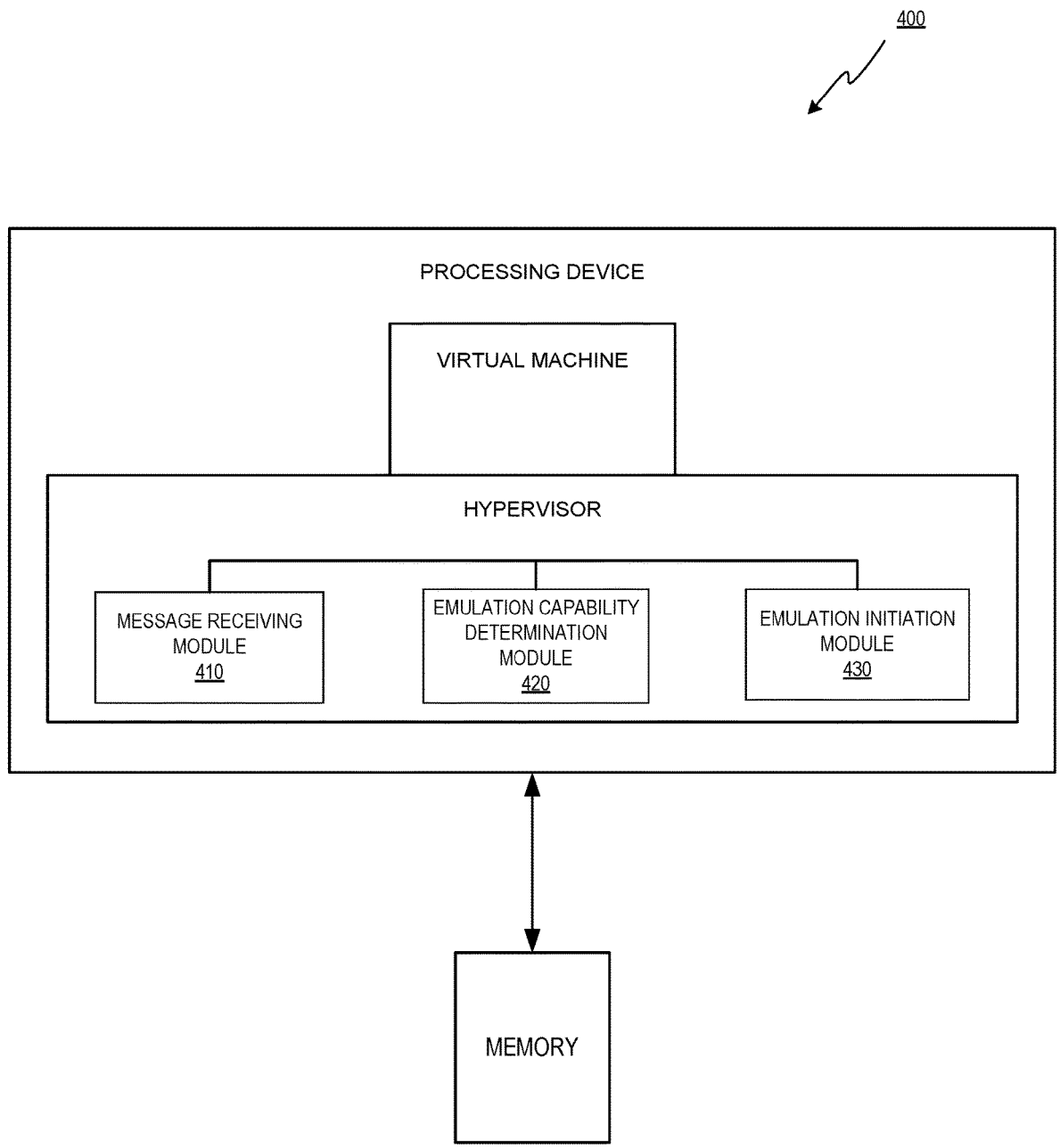
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 100 and may include one or more processing devices and one or more memory devices. In the example shown, computer system 400 may include message receiving module 410, emulation capability module 420, and emulation initiation module 430.

Message receiving module 410 may instruct the processing device to receive a message indicating a hardware feature is unavailable. The message may be received from a hardware interface (e.g., physical hardware interface) and may include data indicating an instruction and a cause associated with the hardware feature that is unavailable. In one example, the message may be received in response to a request received from the virtual machine. The request may be a request to perform a hardware instruction that invokes the hardware feature.

Emulation capability module 420 may instruct the processing device to determine whether a virtual machine is capable of emulating the hardware feature. Determining whether the virtual machine is capable of emulating the hardware features may involve the hypervisor analyzing the message to identify the hardware feature that is unavailable and inspecting a data structure that indicates a plurality of hardware features that the virtual machine is capable of emulating. In one example, the hypervisor may create the data structure, which may include data indicating a plurality of hardware features that the virtual machine can emulate. The hypervisor may also update, during an initiation of the virtual machine, the data of the data structure to indicate the virtual machine can emulate the hardware feature.

Emulation initiation module 430 may instruct the processing device to cause the virtual machine to emulate the hardware feature in response to determining the virtual machine is capable of emulating the hardware feature. Causing the virtual machine to emulate the hardware features may involve the hypervisor to transmit an interrupt generated by a hardware device to the virtual machine to initiate emulation of the hardware feature or transmit an exception generated by the hypervisor to the virtual machine to initiate emulation of the hardware feature. The hypervisor may also or alternatively make a call to the virtual machine to initiate emulation of the hardware feature. In one example, the hypervisor may emulate the hardware feature in response to determining the virtual machine is unable to emulate the hardware feature.

Figure 5:
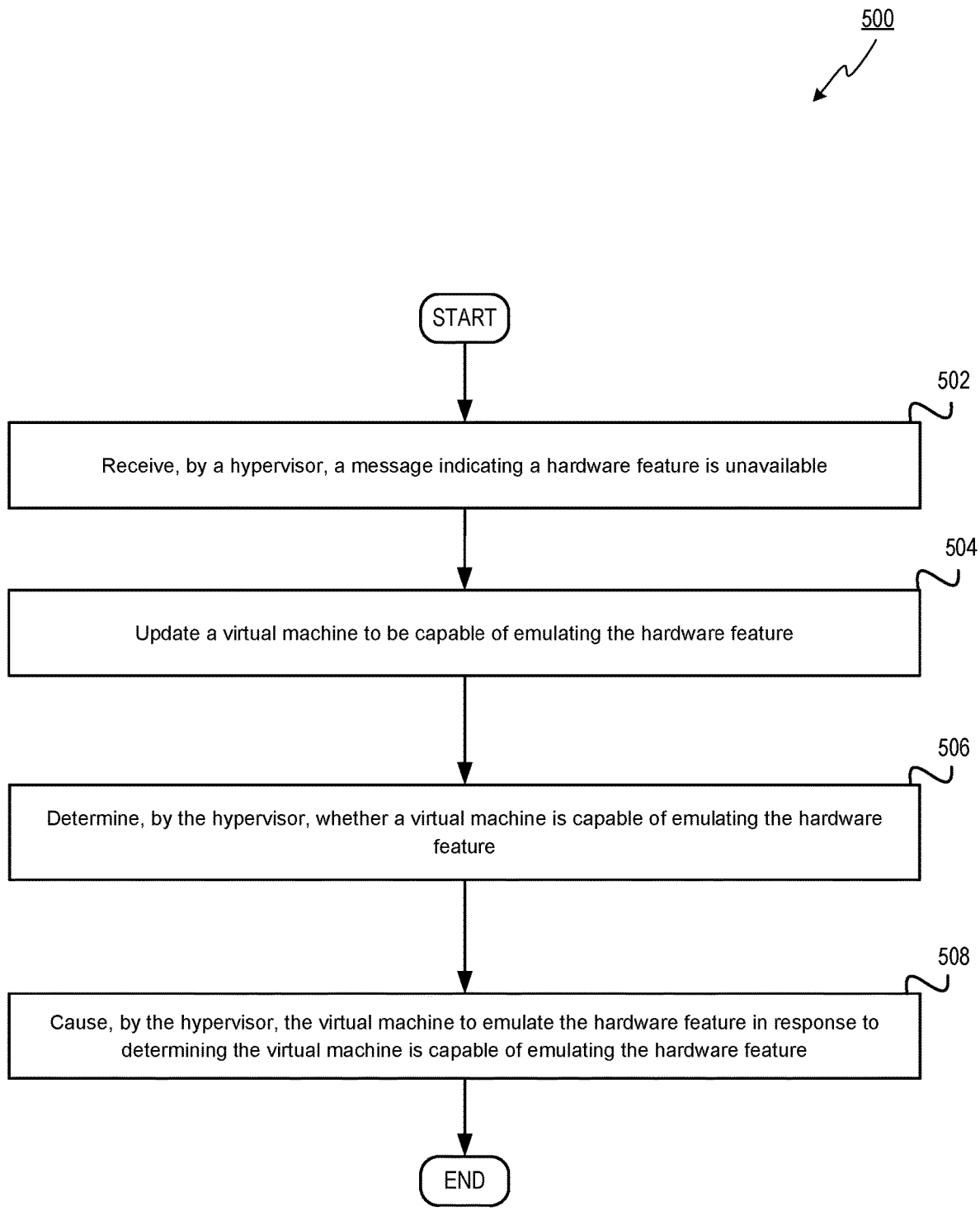
FIG. 5 depicts a flow diagram of another example method for embedding and using emulation functionality of a virtual machine to enhance security, in accordance with one or more aspects of the present disclosure.

FIG. 5 depicts a flow diagram of one illustrative example of a method 500 for embedding the emulation of hardware features into a virtual machine, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, a processing device executing a hypervisor may receive a message indicating a hardware feature is unavailable. The message may be received from a hardware interface (e.g., physical hardware interface) and may include data indicating an instruction and a cause associated with the hardware feature that is unavailable. In one example, the message may be received in response to a request received from the virtual machine. The request may be a request to perform a hardware instruction that invokes the hardware feature.

At block 504, a processing device executing the hypervisor may update the virtual machine to support emulation of the hardware feature. The updating may occur after receiving the message that the hardware feature is unavailable, prior to booting an image of the virtual machine, or during a creation of an image of the virtual machine. In one example, updating the virtual machine may involve modifying a firmware of the virtual machine to emulate the hardware feature. In another example, updating the virtual machine may involve modifying a guest operating system of the virtual machine to comprise a device driver that emulates the hardware feature. The updating of the virtual machine may be performed by the hypervisor or by a separate component executing on the same or a different processing device. In one example, a separate computing system (e.g., management component, provisioning server) may perform the embedding before, during, or after the creation of the virtual machine image. In another example, a separate computing system may interact with a running virtual machine to install or configure the hardware emulation.

At block 506, the processing device executing the hypervisor may determine whether a virtual machine is capable of emulating the hardware feature. Determining whether the virtual machine is capable of emulating the hardware features may involve the hypervisor analyzing the message to identify the hardware feature that is unavailable and inspecting a data structure that indicates a plurality of hardware features that the virtual machine is capable of emulating. In one example, the hypervisor may create the data structure, which may include data indicating a plurality of hardware features that the virtual machine can emulate. The hypervisor may also update, during an initiation of the virtual machine, the data of the data structure to indicate the virtual machine can emulate the hardware feature.

At block 508, the processing device executing the hypervisor may cause the virtual machine to emulate the hardware feature in response to determining the virtual machine is capable of emulating the hardware feature. Causing the virtual machine to emulate the hardware features may involve the hypervisor to transmit an interrupt generated by a hardware device to the virtual machine to initiate emulation of the hardware feature or transmit an exception generated by the hypervisor to the virtual machine to initiate emulation of the hardware feature. The hypervisor may also or alternatively make a call to the virtual machine to initiate emulation of the hardware feature. In one example, the hypervisor may emulate the hardware feature in response to determining the virtual machine is unable to emulate the hardware feature. Responsive to completing the operations described herein above with references to block 508, the method may terminate.

Figure 6:
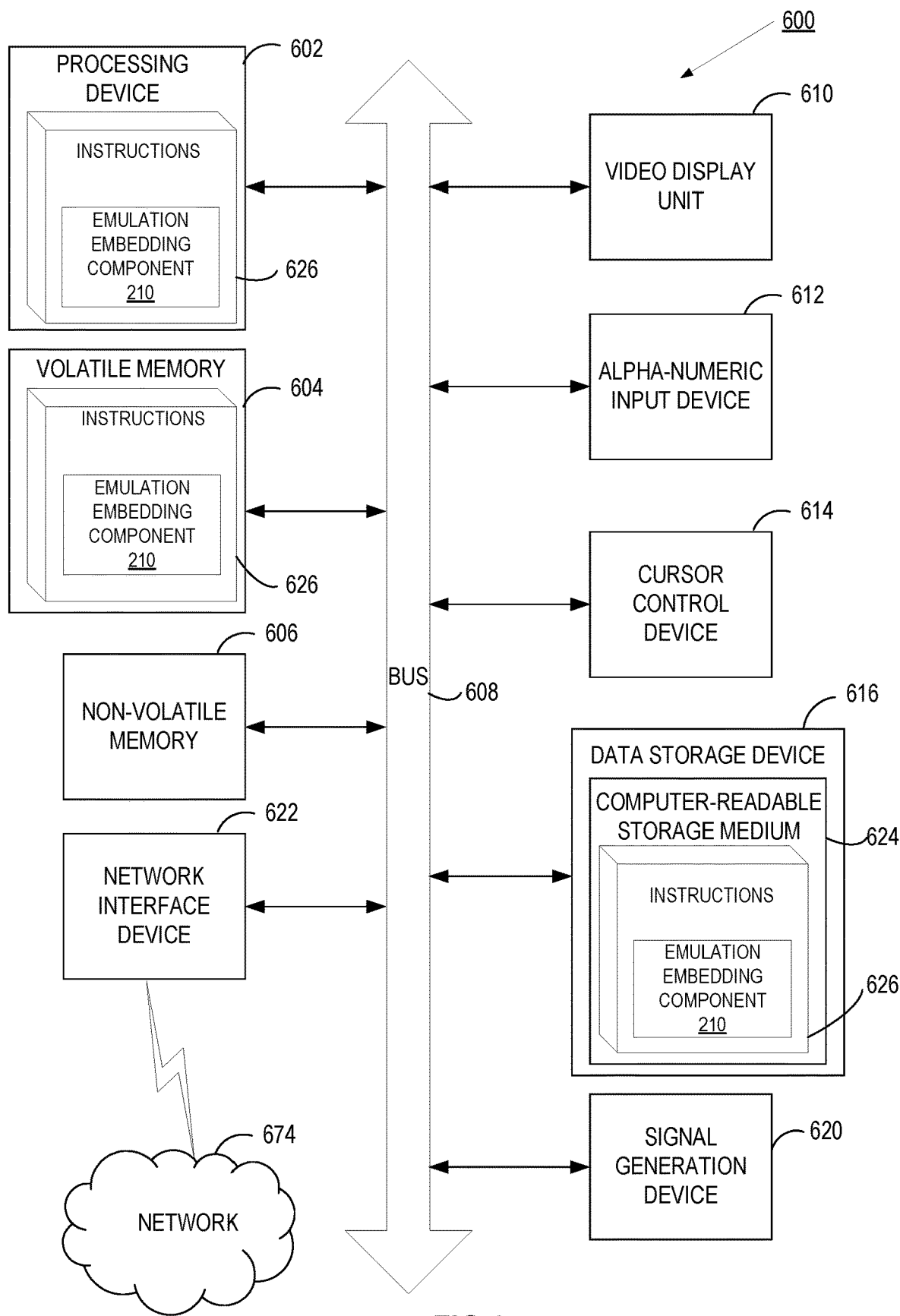
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory.

The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding emulation embedding component 210 and other components and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "causing," "initiating," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a hypervisor executing on a processing device, one or more messages indicating a plurality of hardware features of a hardware device are unavailable to a virtual machine, wherein the plurality of hardware features comprises a first hardware feature and a second hardware feature;
analyzing, by the hypervisor, a message of the one or more messages to identify the first hardware feature;
determining, by the hypervisor, that the virtual machine is capable of emulating the first hardware feature;

causing, by the hypervisor, the virtual machine to emulate the hardware device to provide the first hardware feature; and emulating, by the hypervisor, the second hardware feature in response to determining the virtual machine is unable to emulate the second hardware feature.

2. The method of claim 1, further comprising, updating the virtual machine to support emulation of the first hardware feature, wherein the updating occurs at least one of:

after receiving the message that indicates the first hardware feature is unavailable;

prior to booting an image of the virtual machine; or during a creation of the image of the virtual machine.

3. The method of claim 2, wherein updating the virtual machine comprises adding code to the virtual machine to emulate the first hardware feature.

4. The method of claim 2, wherein updating the virtual machine comprises modifying a guest operating system of the virtual machine to comprise a device driver that emulates the first hardware feature.

5. The method of claim 1, wherein causing the virtual machine to emulate the hardware device to provide the first hardware feature comprises the hypervisor performing at least one of:

transmitting an interrupt initiated by the hardware device to the virtual machine to initiate emulation of the hardware device;

transmitting an exception initiated by the hypervisor to the virtual machine to initiate emulation of the hardware device; or making a call to the virtual machine to initiate emulation of the hardware device.

6. The method of claim 1, further comprising:

creating, by the hypervisor, a data structure, wherein the data structure comprises data indicating a set of hardware features that the virtual machine is capable of emulating; and updating, during an initiation of the virtual machine, the data of the data structure to indicate the virtual machine is capable of emulating the first hardware feature.

7. The method of claim 1, further comprising receiving from the virtual machine a request to perform a hardware instruction that invokes the first hardware feature.

8. The method of claim 1, wherein receiving the one or more messages comprises receiving from a hardware interface an interrupt indicating the first hardware feature is unavailable, wherein the interrupt is associated with data indicating a cause of the interrupt and an instruction attempting to invoke the first hardware feature.

9. The method of claim 1, wherein determining that the virtual machine is capable of emulating the first hardware feature comprises inspecting, by the hypervisor, a data structure that indicates a set of hardware features that the virtual machine is capable of emulating.

10. A system comprising:

a memory;

a processing device operatively coupled to the memory to execute a hypervisor, the processing device to:

receive, by the hypervisor, one or more messages indicating a plurality of hardware features of a hardware device are unavailable to a virtual machine, wherein the plurality of hardware features comprises a first hardware feature and a second hardware feature;

analyze a message of the one or more messages to identify the first hardware feature that is unavailable;

determine, by the hypervisor, that the virtual machine is capable of emulating the first hardware feature;

cause, by the hypervisor, the virtual machine to emulate the hardware device to provide the first hardware feature; and emulate, by the hypervisor, the second hardware feature in response to determining the virtual machine is unable to emulate the second hardware feature.

11. The system of claim 10, wherein the processing device is further to update the virtual machine to support emulation of the first hardware feature, wherein the updating occurs at least one of:

after receiving the messages that indicates the first hardware feature is unavailable;

prior to booting an image of the virtual machine; or during a creation of the image of the virtual machine.

12. The system of claim 11, wherein to update the virtual machine, the processing device is to modify code of the virtual machine to emulate the first hardware feature.

13. The system of claim 11, wherein to update the virtual machine, the processing device is to modify a guest operating system of the virtual machine to comprise a device driver that emulates the first hardware feature.

14. A non-transitory machine-readable storage medium storing instructions that cause a processing device to:

receive, by a hypervisor executing on the processing device, one or more messages indicating a plurality of hardware feature of a hardware device are unavailable to a virtual machine, wherein the plurality of hardware features comprises a first hardware feature and a second hardware feature;

analyze, by the hypervisor, a message of the one or more messages to identify the first hardware feature that is unavailable;

determine, by the hypervisor, that the virtual machine is capable of emulating the first hardware feature;

cause, by the hypervisor, the virtual machine to emulate the hardware device to provide the first hardware feature; and emulate, by the hypervisor, the second hardware feature in response to determining the virtual machine is unable to emulate the second hardware feature.

15. The non-transitory machine-readable storage medium of claim 14, wherein the processing device is further to:

create, by the hypervisor, a data structure, wherein the data structure comprises data indicating a set of hardware features that the virtual machine is capable of emulating; and update, during an initiation of the virtual machine, the data of the data structure to indicate the virtual machine is capable of emulating the first hardware feature.

16. The non-transitory machine-readable storage medium of claim 14, wherein the processing device is further to receive from the virtual machine a request to perform a hardware instruction that invokes the first hardware feature.

17. The non-transitory machine-readable storage medium of claim 14, wherein to update the virtual machine, the processing device is to modify code of the virtual machine to emulate the first hardware feature.

18. The non-transitory machine-readable storage medium of claim 14, wherein to update the virtual machine, the processing device is to modify a guest operating system of the virtual machine to comprise a device driver that emulates the first hardware feature.

* * * * *